United States Patent
Hudson

(10) Patent No.: US 9,995,327 B2
(45) Date of Patent: Jun. 12, 2018

(54) CONNECTOR AND BUILDING SYSTEM

(71) Applicant: Charles D. Hudson, Franklin, TN (US)

(72) Inventor: Charles D. Hudson, Franklin, TN (US)

(*) Notice: Subject to any disclaimer, the term of this patent is extended or adjusted under 35 U.S.C. 154(b) by 0 days. days.

(21) Appl. No.: 15/607,669

(22) Filed: May 29, 2017

(65) Prior Publication Data

US 2017/0350432 A1    Dec. 7, 2017

Related U.S. Application Data

(60) Provisional application No. 62/392,484, filed on Jun. 1, 2016.

(51) Int. Cl.
| | |
|---|---|
| *F16B 5/00* | (2006.01) |
| *E04B 1/61* | (2006.01) |
| *E04C 2/20* | (2006.01) |
| *E04B 1/14* | (2006.01) |
| *E04B 1/38* | (2006.01) |
| *E04C 2/02* | (2006.01) |
| *E04C 2/10* | (2006.01) |
| *E04B 1/02* | (2006.01) |
| *E04C 2/30* | (2006.01) |

(52) U.S. Cl.
CPC .............. *F16B 5/0052* (2013.01); *E04B 1/14* (2013.01); *E04B 1/6137* (2013.01); *E04B 1/6158* (2013.01); *E04C 2/205* (2013.01); *E04B 1/02* (2013.01); *E04B 1/38* (2013.01); *E04B 1/61* (2013.01); *E04B 1/612* (2013.01); *E04B 1/6108* (2013.01); *E04B 1/6125* (2013.01); *E04B 1/6145* (2013.01); *E04C 2/02* (2013.01); *E04C 2/10* (2013.01); *E04C 2/20* (2013.01); *E04C 2/30* (2013.01); *F16B 5/0004* (2013.01); *F16B 5/0032* (2013.01)

(58) Field of Classification Search
CPC . E04B 1/02; E04B 1/6137; E04B 1/14; E04B 1/6158; E04B 1/38; E04B 1/61; E04B 1/6108; E04C 2/205; E04C 2/02; E04C 2/10
See application file for complete search history.

(56) References Cited

U.S. PATENT DOCUMENTS

| | | | | |
|---|---|---|---|---|
| 3,410,474 | A * | 11/1968 | Keil .................... | B65D 81/056 206/453 |
| 4,703,866 | A * | 11/1987 | Scott ....................... | B65D 9/04 217/12 R |
| 6,151,856 | A * | 11/2000 | Shimonohara ........ | E04B 2/8635 52/309.12 |
| 8,789,325 | B2 * | 7/2014 | Verhaeghe .............. | E04B 2/705 4/524 |
| 9,027,298 | B1 * | 5/2015 | Martinez .................. | E04C 2/38 52/262 |
| 9,038,343 | B2 * | 5/2015 | Litaize .................... | E04B 1/043 52/426 |

(Continued)

*Primary Examiner* — Paola Agudelo
(74) *Attorney, Agent, or Firm* — RG Patent Consulting, LLC; Rachel Gilboy

(57) ABSTRACT

A building system including a plurality of building panel members having elongated slots upon a top surface and four side surfaces thereof, and a plurality connector members having a bowtie cross-sectional shape and adapted to slidably and snugly fit within the elongated slots to thereby releasably connect the plurality of building panel members together to form a variety of structures.

13 Claims, 8 Drawing Sheets

(56) References Cited

U.S. PATENT DOCUMENTS

| | | | | |
|---|---|---|---|---|
| 2004/0139680 A1* | 7/2004 | Hambright | ............... | E04B 2/06 |
| | | | | 52/578 |
| 2009/0241460 A1* | 10/2009 | Beaulieu | ............... | E04B 1/6129 |
| | | | | 52/586.2 |
| 2012/0198781 A1* | 8/2012 | Wrightman | ............. | E04B 2/705 |
| | | | | 52/233 |
| 2014/0155182 A1* | 6/2014 | DeBlanco | ............ | A63H 33/008 |
| | | | | 472/136 |
| 2015/0368896 A1* | 12/2015 | Schulte | .................... | E04B 1/54 |
| | | | | 403/364 |

* cited by examiner

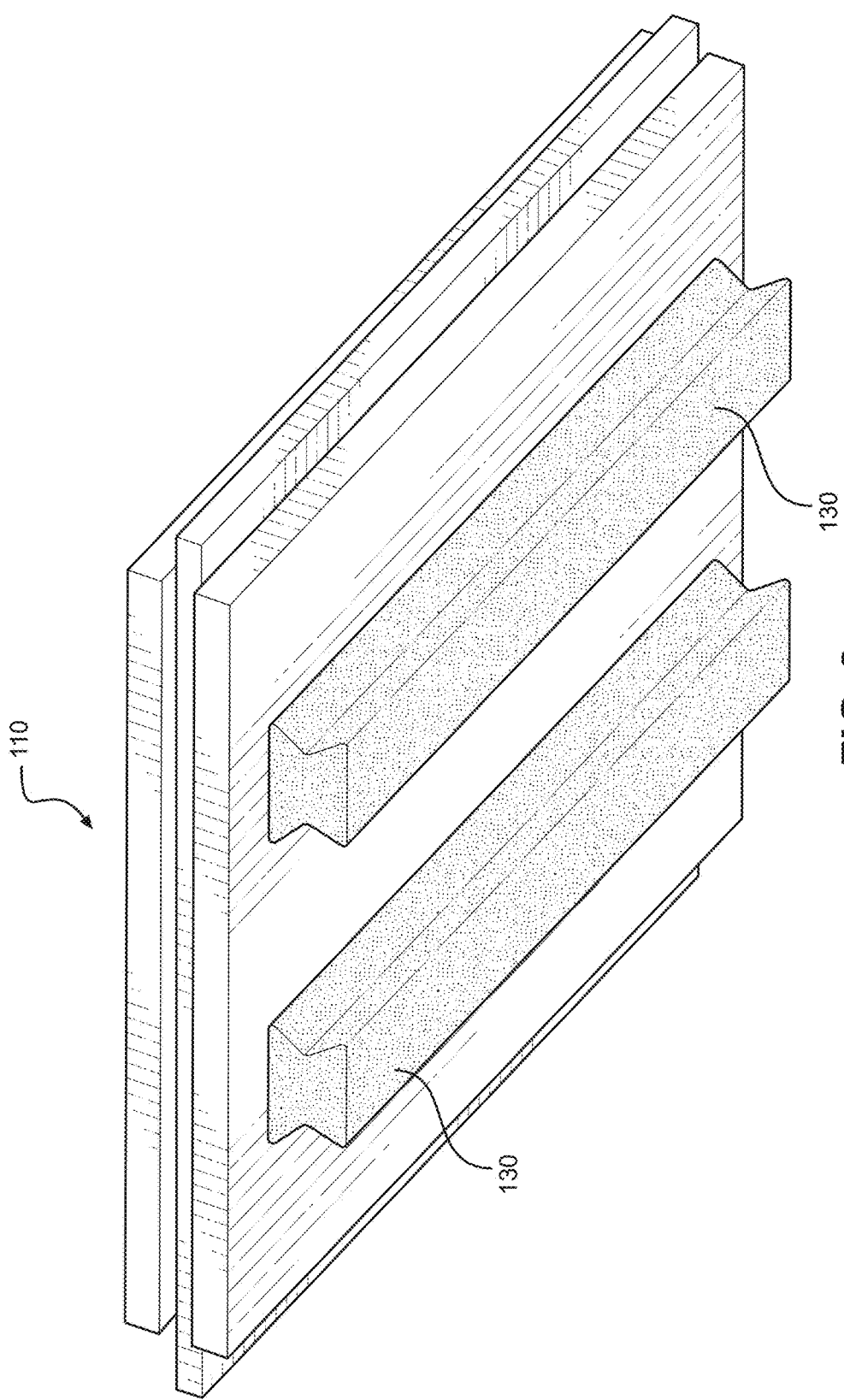

CONNECTOR AND BUILDING SYSTEM

CROSS-REFERENCE TO RELATED APPLICATION

The present application is related to and claims priority from prior provisional application Ser. No. 62/392,484, filed Jun. 1, 2016 which application is incorporated herein by reference.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever. 37 CFR 1.71(d).

BACKGROUND OF THE INVENTION

The following includes information that may be useful in understanding the present invention(s). It is not an admission that any of the information provided herein is prior art, or material, to the presently described or claimed inventions, or that any publication or document that is specifically or implicitly referenced is prior art.

1. Field of the Invention

The present invention relates generally to the field of modular buildings and structures and novel panels and connector members.

2. Description of Prior Art

Modular buildings and structures have been in existence for many years. The previous methods, panels, and connector members required a lot of effort and specialized tools thereby incurring a substantial amount of time and cost to produce. Therefore, a need exists for an improved system, including unique panel and connector members.

BRIEF SUMMARY OF THE INVENTION

In view of the foregoing disadvantages inherent in the known modular buildings and structures. The general purpose of the present invention, which will be described subsequently in greater detail, is to provide an improved modular buildings and structures system, including unique panel and connector members.

The instant building system includes a plurality of building panel members each having a top surface with four elongated sides portions having elongated slots therein, a bottom surface, and four side surfaces between the top and bottom surfaces each having an elongated slot therein, wherein each elongated slot is adapted to slidably receive a portion of a connector member adapted, sized, and shaped to slidably and snugly fit therein to thereby releasably connect the building panel members together; and a plurality connector members each having a middle section having a width that is smaller than the widths of elongated upper and lower sections thereof thereby forming a bowtie cross-sectional shape and adapted, sized, and shaped to slidably and snugly fit within respective elongated slots of the plurality of building panel members to thereby releasably connect the plurality of building panel members together to form a variety of structures.

The present invention holds significant improvements and serves as an improved modular buildings and structures system, including unique panel and connector members. For purposes of summarizing the invention, certain aspects, advantages, and novel features of the invention have been described herein. It is to be understood that not necessarily all such advantages may be achieved in accordance with any one particular embodiment of the invention. Thus, the invention may be embodied or carried out in a manner that achieves or optimizes one advantage or group of advantages as taught herein without necessarily achieving other advantages as may be taught or suggested herein. The features of the invention which are believed to be novel are particularly pointed out and distinctly claimed in the concluding portion of the specification. These and other features, aspects, and advantages of the present invention will become better understood with reference to the following drawings and detailed description.

BRIEF DESCRIPTION OF THE DRAWINGS

The figures which accompany the written portion of this specification illustrate embodiments and method(s) of use for the present invention, a universal second handle constructed and operative according to the teachings of the present invention.

FIG. 8 is a bottom view of a building panel member of the preferred embodiment of the improved building system having two connector members attached thereto to be used as a roof member.

The various embodiments of the present invention will hereinafter be described in conjunction with the appended drawings, wherein like designations denote like elements.

DETAILED DESCRIPTION

Figure 1:
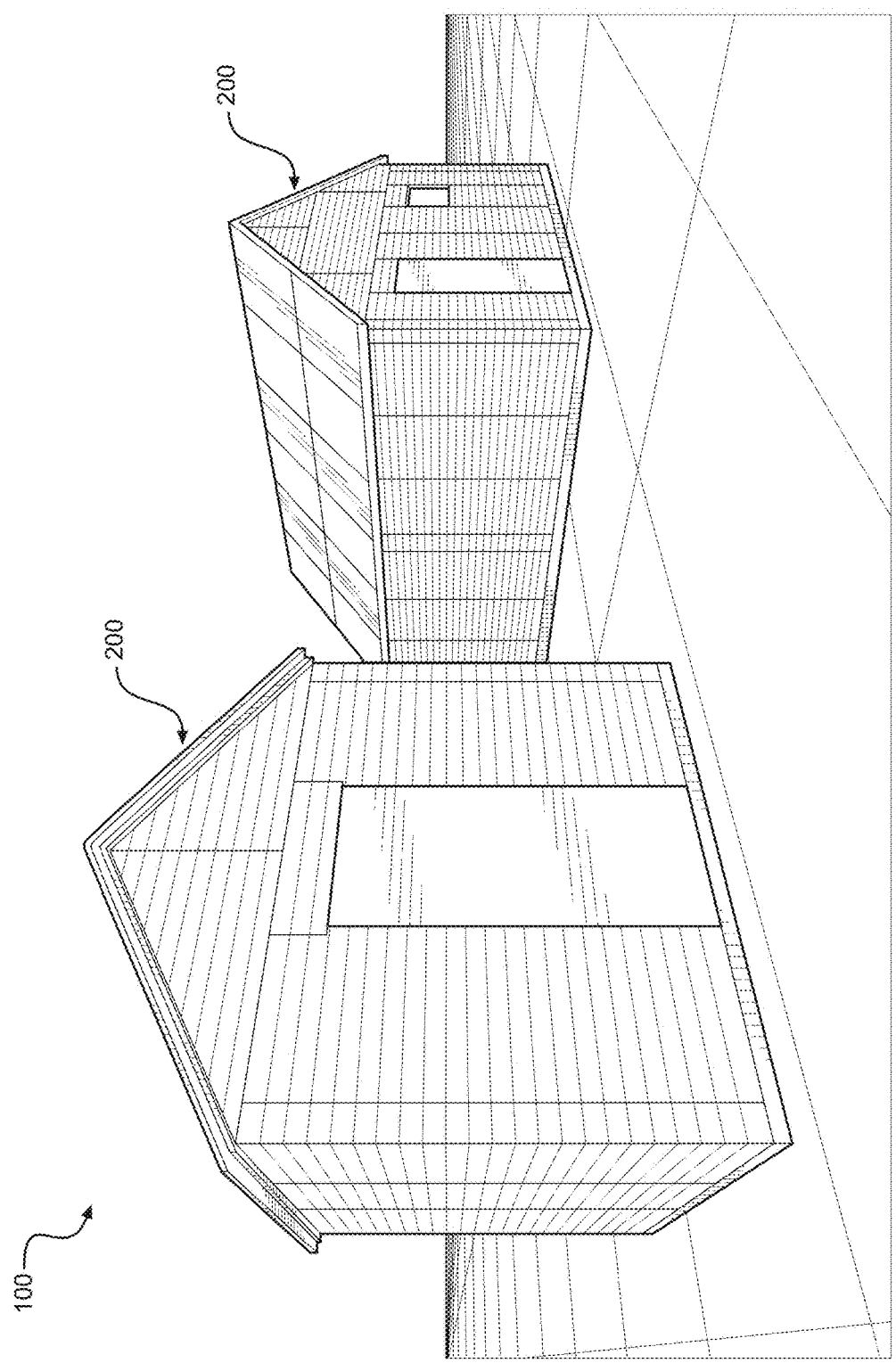
FIG. 1 shows a perspective view of a variety of structures formed by the improved building system according to an embodiment of the present invention.
Figure 2:
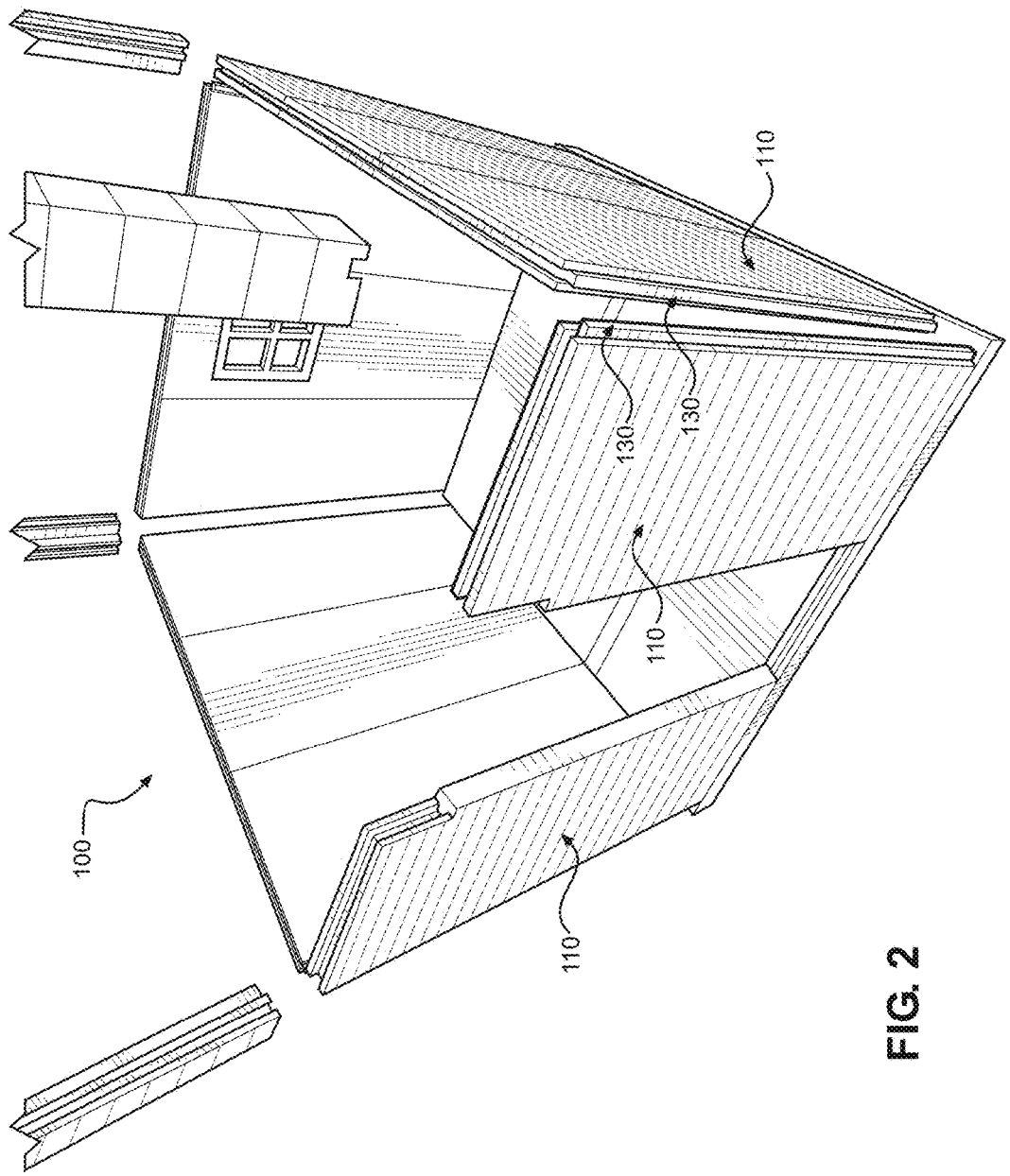
FIG. 2 is an exploded view of a structure formed by the improved building system according to the embodiment of the present invention.

As discussed above, embodiments of the present invention relate to modular buildings and structures and novel panels and connector members.

The preferred embodiment of the present invention is illustrated in FIGS. 1-8, wherein the improved building system 100 comprises a plurality of building panel members 110, each having a top surface 112 including four elongated sides portions 114 having an elongated slot 115 therein including a length, a base surface 116 having a width of constant dimension along its length, and two side walls 117 extending along the length of the elongated slot that are parallel to one another with respect to their respective lengths and angled toward one another with respect to their respective widths, such that an interior space is formed having a dimension that is larger adjacent the base surface than a dimension in proximity to the top surface; a bottom surface 118; and four side surfaces 119 located in between the top and bottom surfaces and including an elongated slot 120 therein, substantially similar to the elongated slots 115 of the top surface, having a length, a base surface having a width of constant dimension along its length, and two side walls extending along the length of the elongated slot that are parallel to one another with respect to their respective lengths and angled toward one another with respect to their respective widths, such that an interior space is formed having a dimension that is larger adjacent the base surface than a dimension in proximity to said top surface, wherein each elongated slot is adapted to slidably receive a portion of a respective connector member adapted, sized, and shaped to slidably and snugly fit therein to thereby releasably connect said building panel members together; and a plurality connector members 130 adapted to removably connect respective building panel members together, wherein each connector member comprises an elongated body including an elongated upper section 131 having a length and a width, an elongated middle section 133 having a length and a width, and an elongated lower section 132 having a length and a width, wherein the widths of the elongated upper section and the elongated lower sections are substantially equal, and wherein the width of the elongated middle section is less than the widths of the elongated upper section and the elongated lower sections, and wherein the plurality of connector members are adapted, sized, and shaped to slidably and snugly fit within respective elongated slots of the plurality of building panel members to thereby releasably connect the plurality of building panel members together to form a variety of structures 200.

In the preferred embodiment, each of the widths of the plurality of connector members' 130 elongated upper section 131, the elongated middle section 133, and the elongated lower section 132 are constant along said lengths thereof. Further, the width of the elongated middle section 133 has a dimension that is between ½ and ⅔ the width of the elongated upper section and the elongated lower section and form a bow-tie shaped cross section.

The plurality of connector members 130 can be formed from a material including stainless steel, ceramic, and plastic, and can be formed having a yellow color on an outer surface thereof.

The top surface 112 and bottom surface 118 of each of the plurality of building panel members are formed from a plastic material, and a middle layer 125 located in between said top surface and said bottom surface is formed from a foam material that provides increased strength, improved insulation properties, and reduces the overall weight thereof. Each of the plurality of building panel members are formed having a length of 8 feet, a width of 3 feet, and a thickness of 3 inches.

Figure 3:
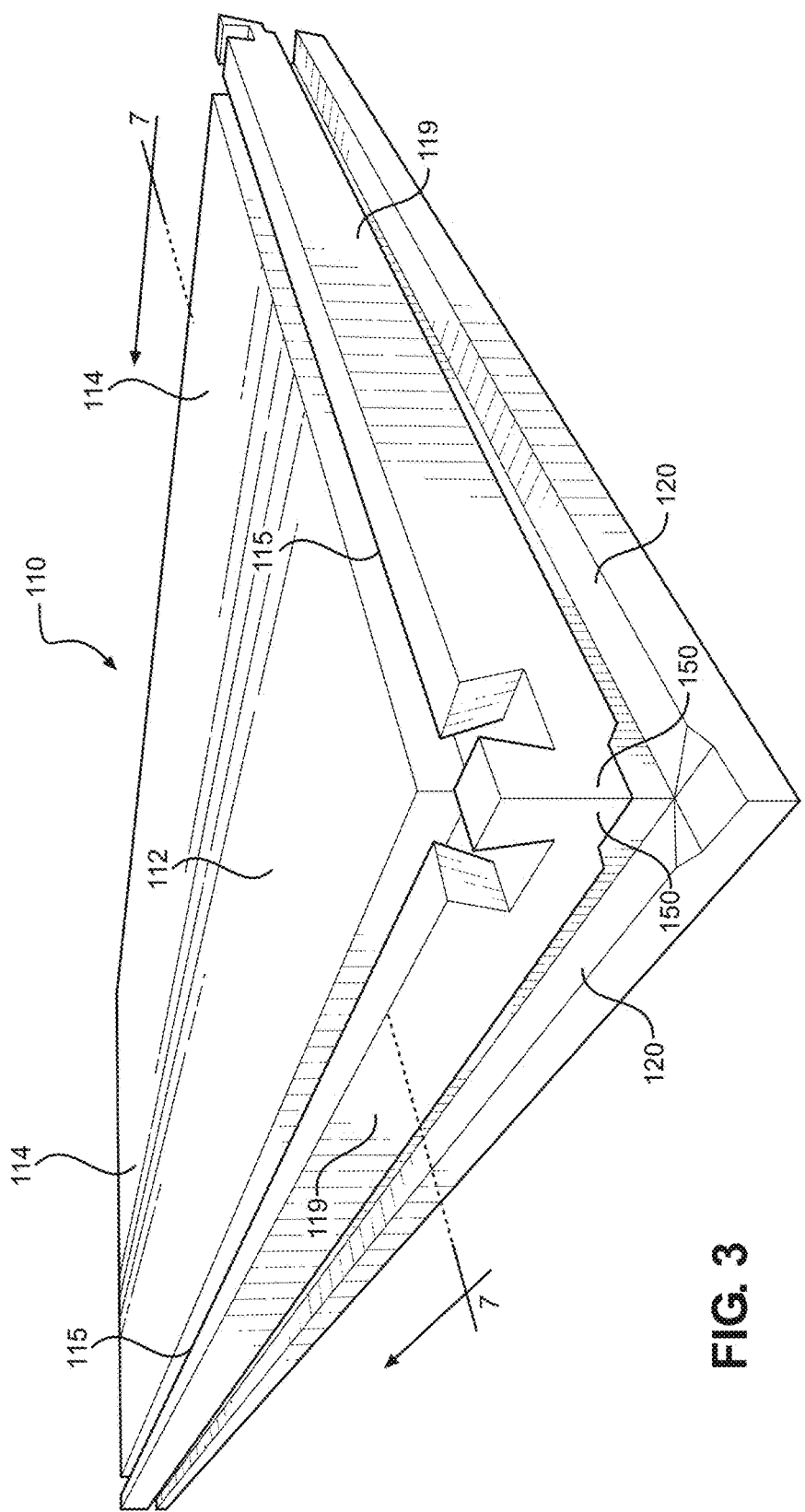
FIG. 3 is a perspective view of a building panel member of the preferred embodiment of the improved building system.
Figure 4:
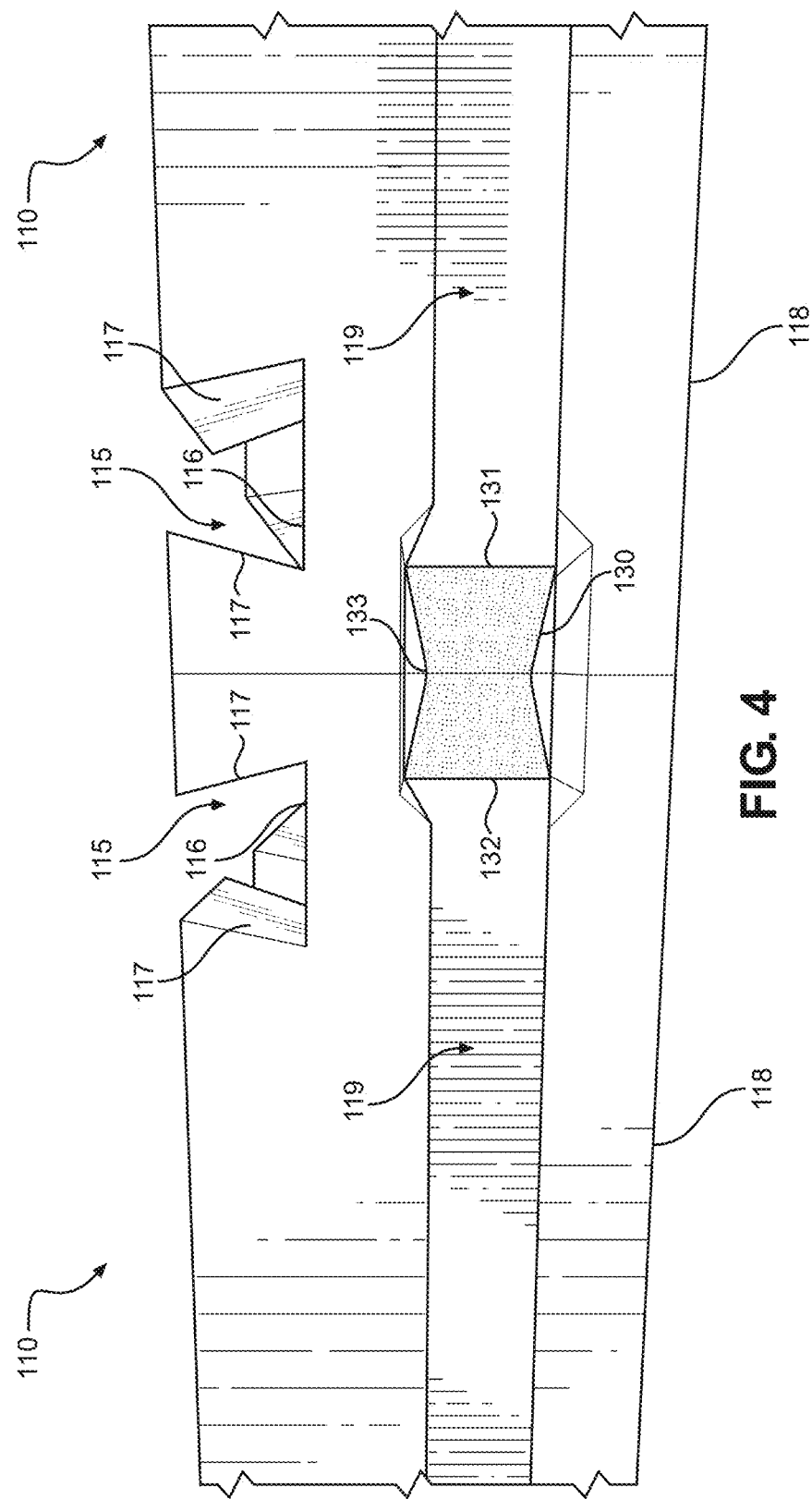
FIG. 4 is a side view illustrating two building panel members connected side-to-side by a connector member of the preferred embodiment of the improved building system.
Figure 5:
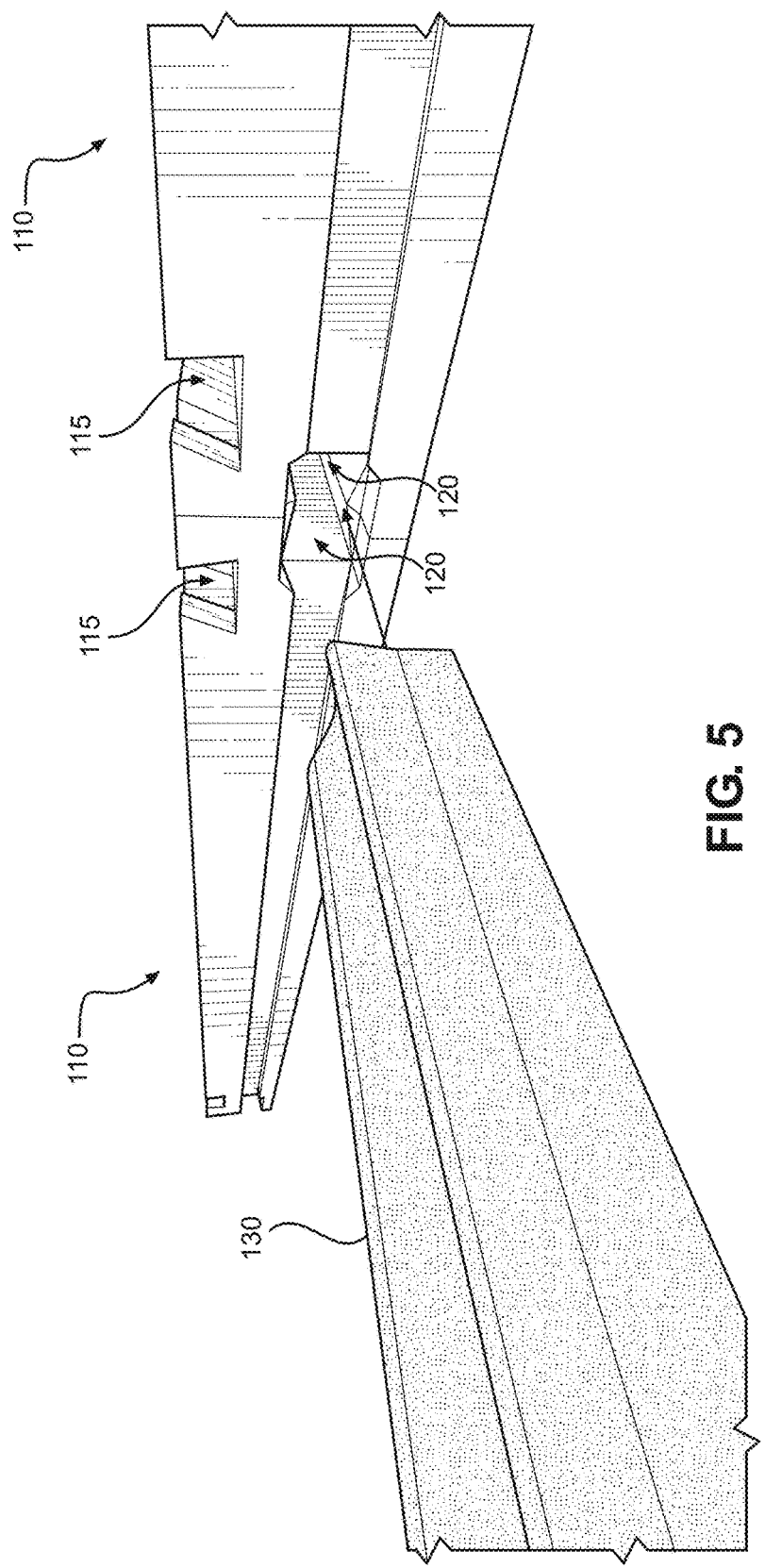
FIG. 5 is a perspective view illustrating two building panel members connected side-to-side by a connector member of the preferred embodiment of the improved building system.
Figure 6:
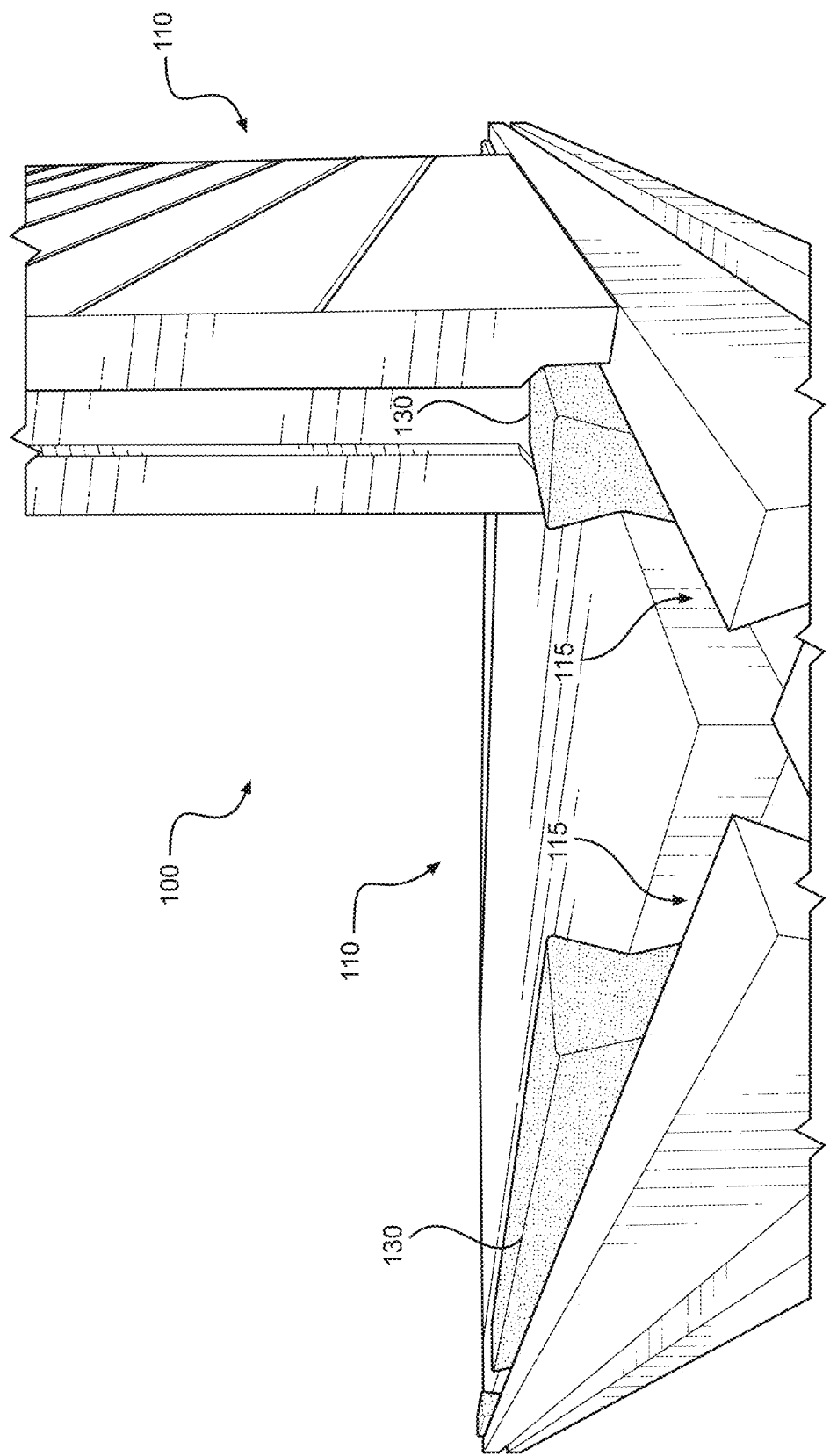
FIG. 6 is a perspective view illustrating two building panel members connected perpendicularly to one another by a connector member of the preferred embodiment of the improved building system.
Figure 7:
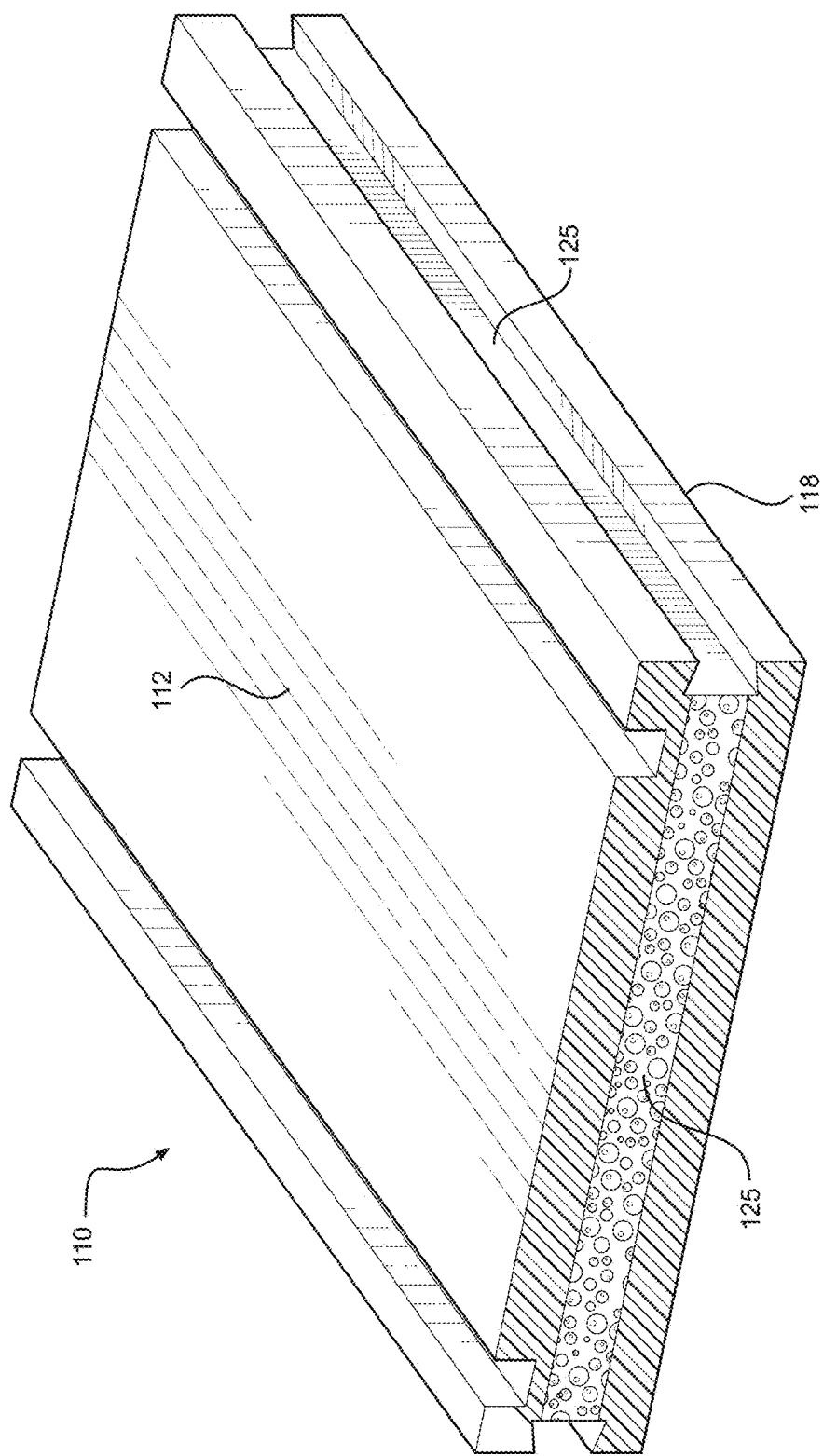
FIG. 7 is a cut-away perspective view illustrating the layers of a building panel member of the preferred embodiment of the improved building system.

As shown in FIG. 3, adjacent elongated slots of the four side portions of the top surface intersect one another at respective end portions 150 thereof. Further, each of these elongated slots are formed having a ½ bow-tie shaped cross section, and the elongated slots of the four side surfaces are also formed having a ½ bow-tie shaped cross section.

As shown in FIG. 8, two of the plurality connector members 130 are attached to the top surface of one of the plurality of building panel members 110, such that it is adapted to be used as a roof member of any of the variety of structures.

The variety of structures 200 created by the instant invention includes houses, cabins, and modular buildings.

The embodiments of the invention described herein are exemplary and numerous modifications, variations and rearrangements can be readily envisioned to achieve substantially equivalent results, all of which are intended to be embraced within the spirit and scope of the invention. Further, the purpose of the foregoing abstract is to enable the U.S. Patent and Trademark Office and the public generally, and especially the scientist, engineers and practitioners in the art who are not familiar with patent or legal terms or phraseology, to determine quickly from a cursory inspection the nature and essence of the technical disclosure of the application.

What is claimed is:

1. A building system comprising:
a plurality of building panel members, each comprising:
    a top surface including;
        four elongated sides portions, each including;
            an elongated slot therein including:
                a length;
                a base surface having a width of constant dimension along said length; and
                two side walls extending along said length of said elongated slot that are parallel to one another with respect to their respective lengths and angled toward one another with respect to their respective widths, such that an interior space is formed having a dimension that is larger adjacent said base surface than a dimension in proximity to said top surface;
    a bottom surface; and
    four side surfaces;
        wherein each of said four side surfaces are in between said top and bottom surfaces and include:
            an elongated slot therein including:
                a length;
                a base surface having a width of constant dimension along said length; and
                two side walls extending along said length of said elongated slot that are parallel to one another with respect to their respective lengths and angled toward one another with respect to their respective widths, such that an interior space is formed having a dimension that is larger adjacent said base surface than a dimension in proximity to said top surface;
        wherein each elongated slot is adapted to slidably receive a portion of a respective connector member adapted, sized, and shaped to slidably and snugly fit therein to thereby releasably connect said building panel members together; and
a plurality connector members adapted to removably connect respective said plurality of building panel members together, each said connector member comprising:
    an elongated body including:
        an elongated upper section;
            wherein said elongated upper section has a length and a width;

an elongated middle section;
   wherein said elongated middle section has a length and a width; and
an elongated lower section;
   wherein said elongated lower section has a length and a width;
wherein said widths of said elongated upper section and said elongated lower sections are substantially equal; and
wherein said width of said elongated middle section is less than said widths of said elongated upper section and said elongated lower sections; and
wherein said plurality of connector members are adapted, sized, and shaped to slidably and snugly fit within respective said elongated slots of respective said plurality of building panel members to thereby releasably connect respective said plurality of building panel members together to form a variety of structures.

2. The building system of claim 1, wherein for each of said plurality of connector members said widths of said elongated upper section, said elongated middle section, and said elongated lower section are constant along said lengths thereof.

3. The building system of claim 2, wherein for each of said plurality of connector members said width of said elongated middle section has a dimension that is between ½ and ⅔ said width of said elongated upper section and said elongated lower section.

4. The building system of claim 3, wherein for each of said plurality of connector members said widths of said elongated upper section, said elongated middle section, and said elongated lower section form a bow-tie shaped cross section.

5. The building system of claim 4, wherein each of said elongated slots of said four elongated side portions of said top surface are formed having a ½ bow-tie shaped cross section; and wherein each of said elongated slots of said four side surfaces are formed having a ½ bow-tie shaped cross section.

6. The building system of claim 1, wherein said plurality of connector members are formed from a material chosen from a list of materials consisting of stainless steel, ceramic, and plastic.

7. The building system of claim 1, wherein said plurality of connector members are formed having a yellow color.

8. The building system of claim 1, wherein said top surface of each of said plurality of building panel members are formed from a plastic material; wherein said bottom surface of each of said plurality of building panel members are formed from a plastic material; and wherein each of said plurality of building panel members further include a middle layer formed from a foam material located in between said top surface and said bottom surface.

9. The building system of claim 8, wherein said foam material is adapted to provide strength, improved insulation properties, and reduce the overall weight of each of said plurality of building panel members.

10. The building system of claim 1, wherein each of said plurality of building panel members are formed having a length of 8 feet, a width of 3 feet, and a thickness of 3 inches.

11. The building system of claim 1, wherein adjacent said elongated slots of said four side portions of said top surface intersect one another at respective end portions thereof.

12. The building system of claim 1, wherein two of said plurality connector members are attached to said top surface of one of said plurality of building panel members, such that said one of said plurality of building panel members is adapted to be used as a roof member of any of said variety of structures.

13. The building system of claim 12, wherein said variety of structures is chosen from a group of structures consisting of houses, cabins, and modular buildings.

\* \* \* \* \*